United States Patent
Zheng et al.

(10) Patent No.: US 10,310,184 B2
(45) Date of Patent: Jun. 4, 2019

(54) METHODS FOR SPLICING OPTICAL FIBERS

(71) Applicant: AFL Telecommunications LLC, Duncan, SC (US)

(72) Inventors: Wenxin Zheng, Moore, SC (US); Robin Carbonnier, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/908,117

(22) Filed: Feb. 28, 2018

(65) Prior Publication Data
US 2018/0259712 A1    Sep. 13, 2018

Related U.S. Application Data

(60) Provisional application No. 62/468,055, filed on Mar. 7, 2017.

(51) Int. Cl.
*G02B 6/255*    (2006.01)
*G02B 6/245*    (2006.01)
*G02B 6/12*     (2006.01)

(52) U.S. Cl.
CPC .......... *G02B 6/2551* (2013.01); *G02B 6/245* (2013.01); *G02B 2006/12192* (2013.01)

(58) Field of Classification Search
CPC .. G02B 6/2551; G02B 6/3846; G02B 6/2555; G02B 6/2558; G02B 6/255
See application file for complete search history.

(56) References Cited

U.S. PATENT DOCUMENTS

| 5,572,313 A | * | 11/1996 | Zheng | G02B 6/2551 356/73.1 |
| 8,600,207 B2 | * | 12/2013 | Broeng | G02B 6/02328 385/122 |

OTHER PUBLICATIONS

High power ZBLAN glass fiber lasers: review and prospect; Xiushan Zhu and N. Peyghambarian College of Optical Sciences, University of Arizona, 1641 East University Boulevard, Tucson, Arizona 85721, USA; (50 pages).

(Continued)

*Primary Examiner* — Jennifer Doan
(74) *Attorney, Agent, or Firm* — Dority & Manning, P.A.

(57) ABSTRACT

A method for splicing optical fibers includes aligning the cores of a first optical fiber and second optical fiber to be spliced together such that the cores are both generally concentric along a longitudinal axis. The method further includes heating the end portions of the first and second optical fibers, and moving at least one of the first or second optical fiber towards the other of the first or second optical fiber along the longitudinal axis such that the end portion of the second optical fiber protrudes into the end portion of the first optical fiber. The method further includes discontinuing heating of the end portions of the first and second optical fibers, and continuing moving the at least one of the first or second optical fiber towards the other of the first or second optical fiber after discontinuing heating.

20 Claims, 4 Drawing Sheets

(56) References Cited

OTHER PUBLICATIONS

An Effective Thermal Splicing Method to Join Fluoride and Silica Fibers for a High Power Regime; Zheng Zhi-Jian, Ouyang De-Qin, Zhao Jun-Qing, Ruan Shuang-Chen, Yu Jun, Guo Chun-Yu, Wang Jin-Zhang; Shenzhen Key Laboratory of Laser Engineering, Key Laboratory of Advanced Optical Precision Manufacturing Technology of Guangdong Higher Education Institutes, College of Optoelectronic Engineering, Shenzhen University, Shenzhen 518060; Chin. Phys. Lett. vol. 32, No. 11 (2015) 114206; (4 pages).

Development of ZBLAN Fiber-Based Components; Hsin-yu Lu; Department of Electrical and Computer Engineering; McGill University Montreal, Quebec, Canada Dec. 2011; A thesis submitted to McGill University in partial fulfillment of requirements for the degree of Master of Engineering; (92 pages).

A Thermal Splicing Method to Join Silica and Fluoride Fibers; Rawaa Al-Mahrous, Reinhard Caspary, and Wolfgang Kowalsky; Journal of Lightwave Technology, vol. 32, No. 2, January 15, 2014, (6 pages).

Low Loss Splicing Method to Join Silica and Fluoride Fibers; Pei Li1,2*, Dong Xiaowei1,2, Zhao Ruifeng1,2; Qi Chunhui1,2; Reinhard Caspary3; Mah Siew Kien3; Jian Shuisheng1,2; 1.Key lab of all optical network & advanced telecommunication network, Ministry of Education. China; 2.Institute of Light-wave Technology, Beijing Jiaotong University, Beijing, 100044, China; 3.Institute of High-Frequency Engineering, Technical University at Braunschweig, D-38106 Germany; Passive Components and Fiber-based Devices IV, edited by Ming-Jun Li. Jianping Chen, Satoki Kawanishi, Ian Hugh White, Proc. of SPIE vol. 6781, 67814O, (2007) 0277-786X/07/$18 • doi: 10.1117/12.745490; (6 pages).

Efficient 521 nm all-fiber laser: splicing Pr3-doped ZBLAN fiber to end-coated silica fiber; Hideyuki Okamoto,* Ken Kasuga, and Yoshinori Kubota; Chemical Research Center, Central Glass Co., Ltd., 2805 Imafuku-Nakadai Kawagoe, Saitama 350-1151, Japan; posted Mar. 23, 2011 (Doc. ID 143153); published Apr. 15, 2011; Optics Letters / vol. 36, No. 8 / Apr. 15, 2011; (3 pages).

Characterization of fiber tapers for fiber devices and sensors; Xiaozhen Wang, Ottawa-Carleton Institute for Physics University of Ottawa; Ottawa, Canada. 2012; (178 pages).

Effect of taper geometries and launch angle on evanescent wave penetration depth in optical fibers; Mohammad Ahmad*, Larry L. Hench; Department of Materials, Royal School of Mines, South Kensington Campus, Imperial College of Science, Technology and Medicine, London SW7 2BP, UK; Biosensors and Bioelectronics 20 (2005) 1312-1319; (9 pages).

Study on thermal splicing of ZBLAN fiber to silica fiber: Tengchao Huang; Qing He; Xuan She Xiaowu Shu; Cheng Liu, Optical Engineering 55(10), 106119 (Oct. 2016); (5 pages).

* cited by examiner

METHODS FOR SPLICING OPTICAL FIBERS

PRIORITY STATEMENT

The present application claims priority to U.S. Provisional Patent Application Ser. No. 62/468,055, filed Mar. 7, 2017, which is incorporated by reference herein in its entirety.

FIELD

The present disclosure related generally to methods for splicing optical fibers, and more particularly, for methods for splicing dissimilar optical fiber types together.

BACKGROUND

Optical fibers are utilized in a variety of fields and applications. While silica optical fibers are generally one of the more frequently known and utilized types of optical fibers, other types of optical fibers are being more frequently investigated and utilized. For example, fluoride optical fibers have recently drawn increasing interest with regard to certain laser operations, such as at wavelengths where silica optical fibers do not perform well.

However, one limitation to the use of fluoride optical fibers is the difficulty in efficiently inject and extract light to or from such optical fibers using silica optical fibers. Although free space and butt coupling have provided acceptable results, consistent and long lasting physical joints between silica and fluoride optical fibers would allow smaller, cheaper, and more robust component manufacturing. However, while low loss splices between silica and fluoride optical fibers have been reported using a traditional splicing approach, the very low mechanical strength of the joint makes it difficult to scale.

Accordingly, improved methods for splicing silica and fluoride optical fibers together are desired in the art. In particular, methods which provide more robust, consistent, and long-lasting joints between such silica and fluoride optical fibers would be advantageous.

BRIEF DESCRIPTION

Aspects and advantages of the invention will be set forth in part in the following description, or may be obvious from the description, or may be learned through practice of the invention.

In accordance with one embodiment, a method for splicing optical fibers is provided. The method includes aligning the cores of a first optical fiber and second optical fiber to be spliced together such that the cores are both generally concentric along a longitudinal axis. A maximum outer diameter of an end portion of the second optical fiber is less than a maximum outer diameter of an end portion of the first optical fiber. The first optical fiber is a fluoride optical fiber and the second optical fiber is a silica optical fiber. The method further includes heating the end portions of the first and second optical fibers. The method further includes moving, during the heating step, at least one of the first or second optical fiber towards the other of the first or second optical fiber along the longitudinal axis such that the end portion of the second optical fiber protrudes into the end portion of the first optical fiber. The method further includes discontinuing heating of the end portions of the first and second optical fibers. The method further includes continuing moving the at least one of the first or second optical fiber towards the other of the first or second optical fiber after discontinuing heating.

In accordance with another embodiment, a method for splicing optical fibers is provided. The method includes aligning the cores of a first optical fiber and second optical fiber to be spliced together such that the cores are both generally concentric along a longitudinal axis. A maximum outer diameter of an end portion of the second optical fiber is less than a maximum outer diameter of an end portion of the first optical fiber. The first optical fiber is a fluoride optical fiber and the second optical fiber is a silica optical fiber. After aligning the cores a gap is defined along the longitudinal axis between the end portions of the first end second optical fibers. The method further includes heating the end portions of the first and second optical fibers to between 175 and 325 degrees Celsius. The method further includes moving, during the heating step, at least one of the first or second optical fiber towards the other of the first or second optical fiber along the longitudinal axis such that the end portion of the second optical fiber protrudes into the end portion of the first optical fiber. The method further includes discontinuing heating of the end portions of the first and second optical fibers. The method further includes continuing moving the at least one of the first or second optical fiber towards the other of the first or second optical fiber after discontinuing heating.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
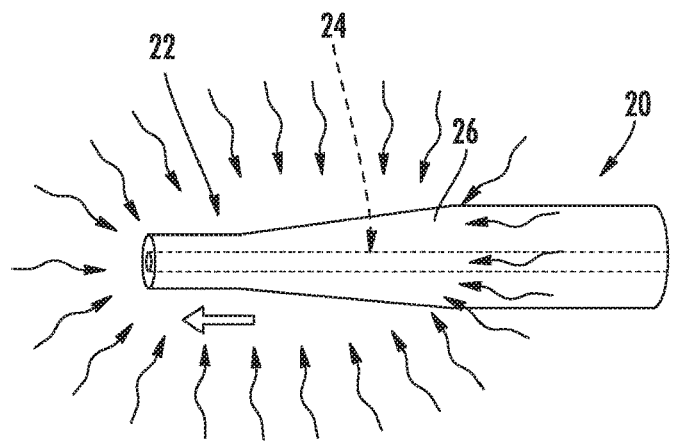
FIG. 1 illustrates a second optical fiber during tapering thereof in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to improved methods and apparatus for splicing optical fibers, more specifically splicing a fluoride optical fiber and a silica optical fiber together. In general, methods in accordance with the present disclosure advantageously utilize differences in melting points and thermal expansion coefficients between fluoride and silica optical fibers to facilitate such splicing by mechanically bonding the fibers together. Such splice is in exemplary embodiments performed with no intermediate material. The resulting bonded joint is advantageously robust, consistent, and long-lasting relative to known attempts at splicing such dissimilar optical fiber materials together.

The various steps of the splicing processes as discussed herein are in exemplary embodiments performed by a suitable device which can perform splicing and other optical fiber processing functions. In exemplary embodiments, for example, such device is a $CO_2$ laser-based optical fiber processing station. One particularly suitable such station is the LZM-100 available from AFL Telecommunications LLC of Duncan, S.C. $CO_2$ laser-based optical fiber processing stations are particularly advantageous for use in accordance with the present disclosure due to the precise heating capabilities of such stations. However, it should be understood that the present disclosure is not limited to such stations, and rather that any suitable stations, whether using $CO_2$ laser based heating or other suitable heating means, is within the scope and spirit of the present disclosure.

Referring now to FIGS. 1 through 7, embodiments of methods for splicing optical fibers in accordance with the present disclosure are provided. The optical fibers to be spliced may be a first optical fiber 10 and a second optical fiber 12. The first optical fiber is a fluoride optical fiber, while the second optical fiber is a silica optical fiber. In exemplary embodiments, the fluoride optical fiber has the composition $ZrF_4$—$BaF_2$—$LaF_3$—$AlF_3$—$NaF$, conventionally referred to as a Zblan optical fiber.

The first optical fiber 10 and second optical fiber 20 may each include an end portion 12, 22, respectively, to be joined together during splicing. The end portions 12, 22 are generally portions of the lengths of the optical fibers 10, 20 to be spliced together and which include the end faces of those optical fibers 10, 20 which are to be joined together during splicing.

Each optical fiber 10, 20 (including the end portions 12, 22 thereof) may generally include a core 14, 24, respectively, and a cladding 16, 26, respectively, surrounding the core 14, 24. As shown, the end portions 12, 22 each have a maximum outer diameter (or cladding diameter) 18, 28. In exemplary embodiments, the maximum outer diameter 28 is less than the maximum outer diameter 18. This allows for the end portion 22 to be inserted into the end portion 12 during the splicing process, as discussed herein. In some exemplary embodiments, the maximum outer diameter 28 is at least 25% smaller than the maximum outer diameter 18. In some specific embodiments, the maximum outer diameter 28 is approximately 80 microns, and the maximum outer diameter 18 is 125 microns. Alternatively, other suitable outer diameters may be utilized.

Figure 5:
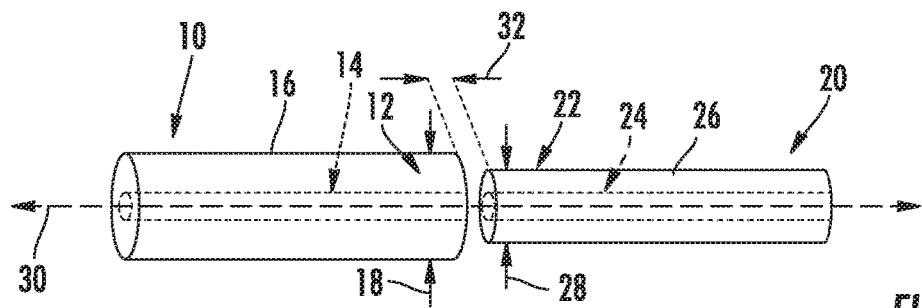
FIG. 5 illustrates a first optical fiber and a second optical fiber during aligning thereof in accordance with other embodiments of the present disclosure.
Figure 6:
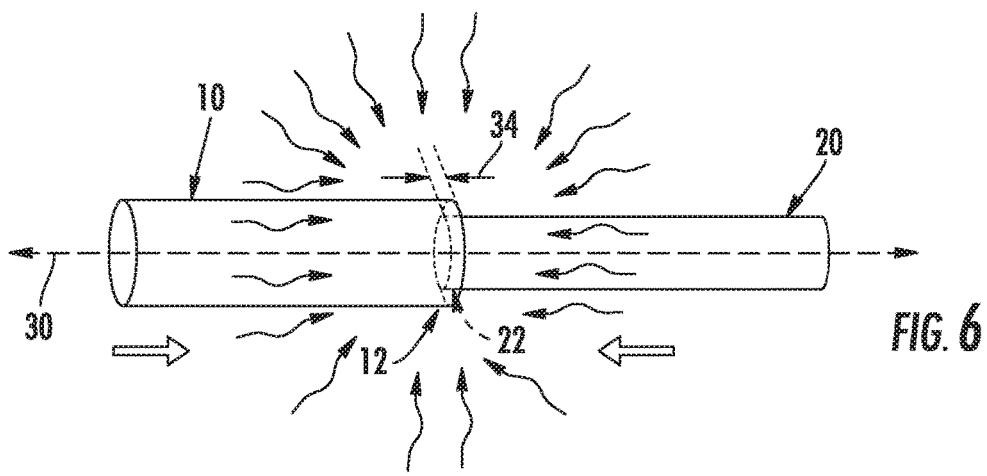
FIG. 6 illustrates a first optical fiber and a second optical fiber during heating and moving thereof in accordance with other embodiments of the present disclosure.
Figure 7:
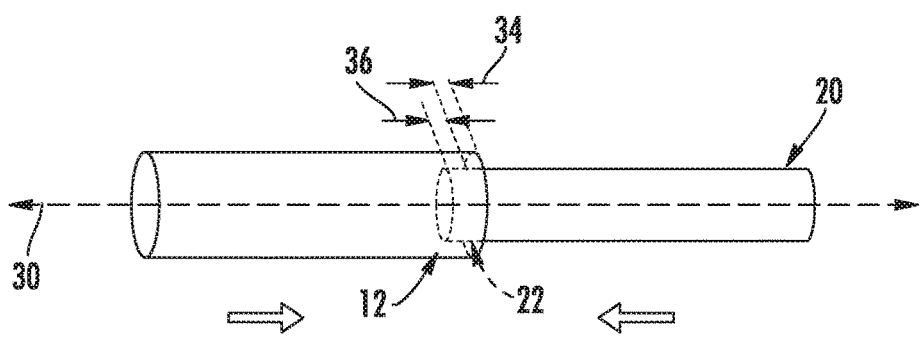
FIG. 7 illustrates a first optical fiber and a second optical fiber during continued movement after discontinued heating in accordance with other embodiments of the present disclosure.

In some embodiments, as shown in FIG. 5, the entire optical fiber 20 may have the relatively smaller maximum outer diameter 28. Accordingly, the end portion 22 may have the same maximum outer diameter as the remainder of the optical fiber 20. In other embodiments, as shown in FIG. 1, the maximum outer diameter 28 may be less than the remainder of the optical fiber 20. For example, as shown, the end portion 22 may be tapered (such as adiabatically tapered) from the remainder of the optical fiber 20. Another portion of the optical fiber 20 may, in some embodiments, thus have a larger maximum outer diameter 28 than the end portion 22 and may in some cases be equal to or greater than the maximum outer diameter 18. Accordingly, in these embodiments, methods in accordance with the present disclosure include tapering the second optical fiber 20 to have the end portion 22 with a maximum outer diameter 28 that is less than the maximum outer diameter 18 of the end portion 12 of the first optical fiber 10. Such tapering may include heating the second optical fiber 20 and stretching an end of the second optical fiber 20 from the main body of the second optical fiber 20, causing this end to become reduced in size, thus forming the end portion 22. In these embodiments, any suitable tapering techniques may be utilized to form the end portion 22.

Figure 2:
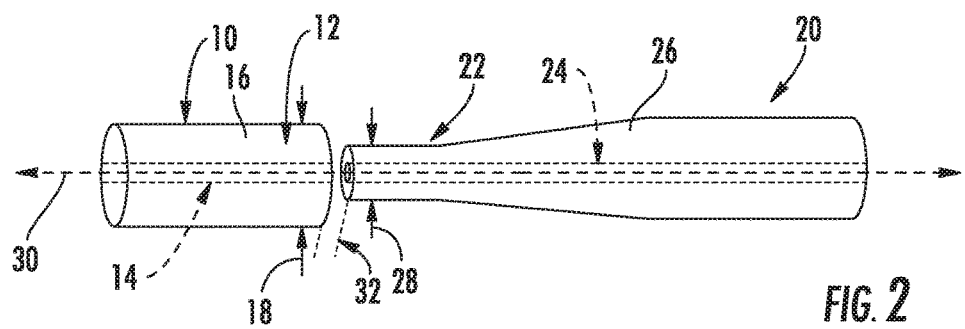
FIG. 2 illustrates a first optical fiber and a tapered and cleaved second optical fiber during aligning thereof in accordance with embodiments of the present disclosure.
Figure 3:
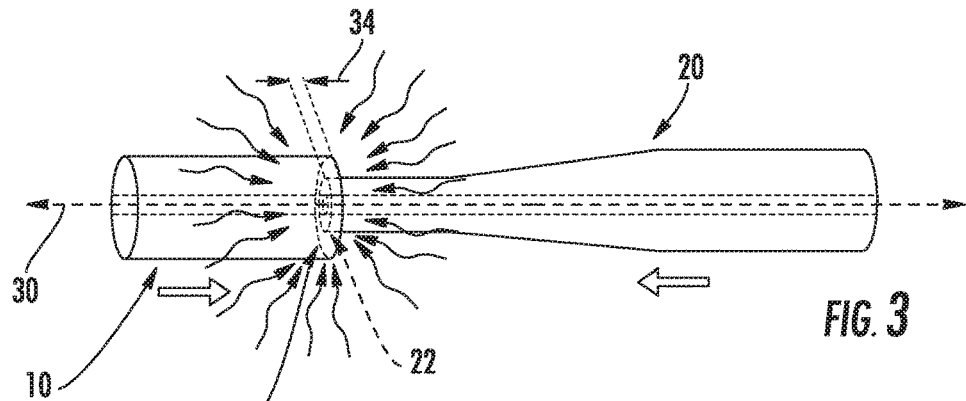
FIG. 3 illustrates a first optical fiber and a second optical fiber during heating and moving thereof in accordance with embodiments of the present disclosure.
Figure 4:
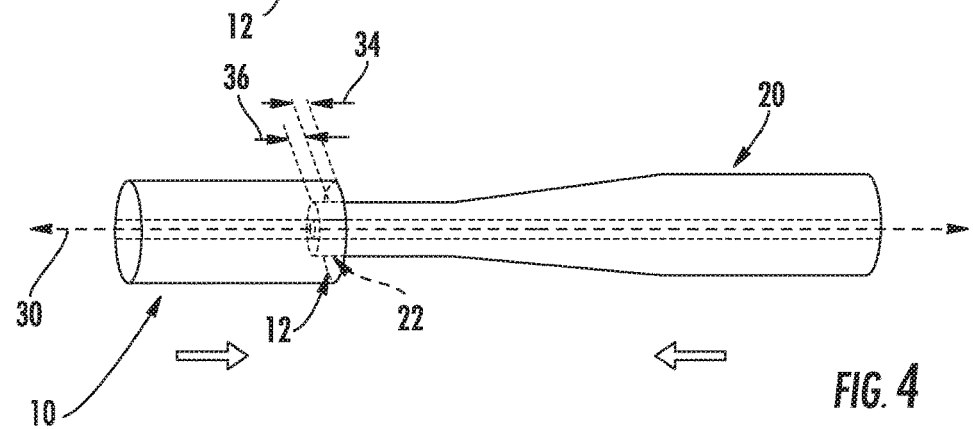
FIG. 4 illustrates a first optical fiber and a second optical fiber during continued movement after discontinued heating in accordance with embodiments of the present disclosure.

In some embodiments, after tapering the second optical fiber 20 to form the end portion 22 as discussed herein, the end portion 22 may be cleaved. A cleaved end portion 22 is illustrated in FIG. 2. The cleaved end portion 22 in these embodiments may be suitable for splicing as discussed herein.

A method in accordance with the present disclosure may further include the step of aligning the cores 14, 24 of the optical fibers 10, 20 to be spliced together. Such alignment may be generally with respect to a longitudinal axis 30, such that when the cores 14, 24 are aligned, they are both generally concentric along the longitudinal axis 30. Accordingly, alignment may include translation of the optical fibers 10, 20 along axes that are transverse to the longitudinal axis 30 and/or rotation of the optical fibers 10, 20 to be generally parallel with the longitudinal axis 30. Alignment may further include utilization of a power feedback method, for example using the setup illustrated in FIG. 9 and as discussed herein.

After such alignment and, in some embodiments, as a result of such alignment, a gap 32 may be defined along the longitudinal axis 30 between the end portions 12, 22 (i.e. between the end faces thereof). In exemplary embodiments, the gap 32 may be between 5 microns and 30 microns, such as between 5 microns and 25 microns.

A method in accordance with the present disclosure may further include heating the end portions 12, 22. Such heating step in exemplary embodiments is performed after the cores 14, 24 are aligned. In exemplary embodiments, such heating is performed by a $CO_2$ laser. Alternatively, other suitable heating apparatus may be utilized.

As discussed, the first optical fiber is a fluoride optical fiber, which the second optical fiber is a silica optical fiber. The melting point of fluoride optical fibers is considerably lower than the melting point of silica optical fibers. Accordingly, in exemplary embodiments, the end portions 12, 22 may be heated to the melting point of the first optical fiber. The end portions 12, 22 may not be heated to the melting point of the second optical fiber 20, and in some embodiments may further not be heated to above the melting point of the first optical fiber 10. In some embodiments, for example, the end portions 12, 22 may be heated to between 175 degrees and 325 degrees Celsius, such as between 200 and 300 degrees Celsius. Such temperature within these temperature ranges may be a maximum temperature to which the end portion 12, 22 are heated.

A method in accordance with the present disclosure may further include moving one or both of the first or second optical fibers 10, 20 towards the other along the longitudinal axis 30. Such movement may occur during the heating step. However, in exemplary embodiments, the heating step may begin prior to the moving step. For example, in exemplary embodiments, the heating step may begin between 50 and 200 milliseconds prior to the moving step, such as between 80 and 170 milliseconds prior to the moving step, such as between 100 and 150 milliseconds prior to the moving step.

In exemplary embodiments, the one or both of the first or second optical fibers 10, 20 are moved towards the other along the longitudinal axis 30 at between 0.05 and 0.25 millimeters per second, such as at between 0.07 and 0.23 millimeters per second, such as between 0.08 and 0.20 millimeters per second, such as between 0.09 and 0.15 millimeters per second, such as approximately 0.1 millimeter per second.

Movement of at least one of the first or second optical fibers 10, 20 towards the other along the longitudinal axis 30 may cause the end portion 22 to contact the end portion 12. Further, such movement may cause, after such initial contact, the end portion 22 to protrude into the end portion 12. In exemplary embodiments, a maximum length 34 (along the longitudinal axis) of between 5 and 30 microns, such as between 10 and 20 microns, of the end portion 22 is protruded into the end portion 12.

A method in accordance with the present disclosure may further include, for example, the step of discontinuing heating of the end portions 12, 22 of the first and second optical fibers 10, 20. Such discontinuance may occur, for example, during movement as discussed herein but upon a predetermined or desired length (such as maximum length 34) of end portion 22 being protruded into end portion 12.

A method in accordance with the present disclosure may further include, for example, continuing moving the one or both of the first or second optical fibers 10, 20 towards the other after discontinuing heating. In exemplary embodiments, a maximum additional length 36 (beyond, for example, the maximum length 34) of between 2 and 10 microns of the end portion 22 is protruded into the end portion 12 during the continuing moving step.

EXAMPLE 1

Figure 8:
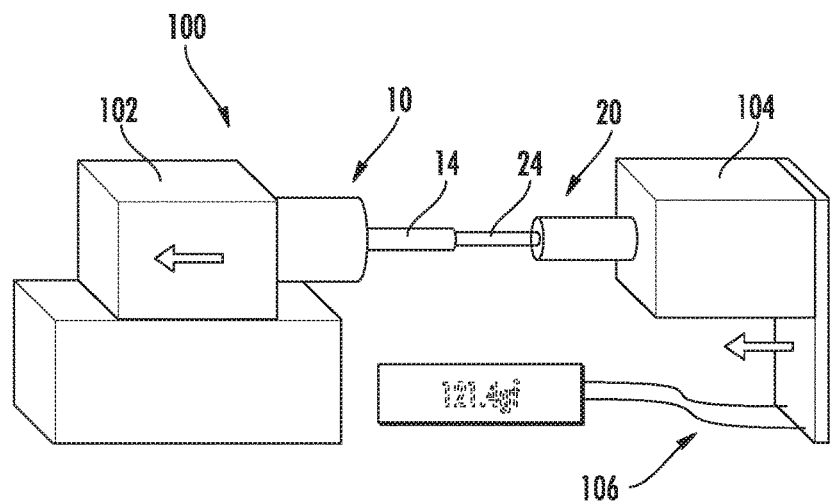
FIG. 8 illustrates a strength test setup in accordance with embodiments of the present disclosure.
Figure 9:
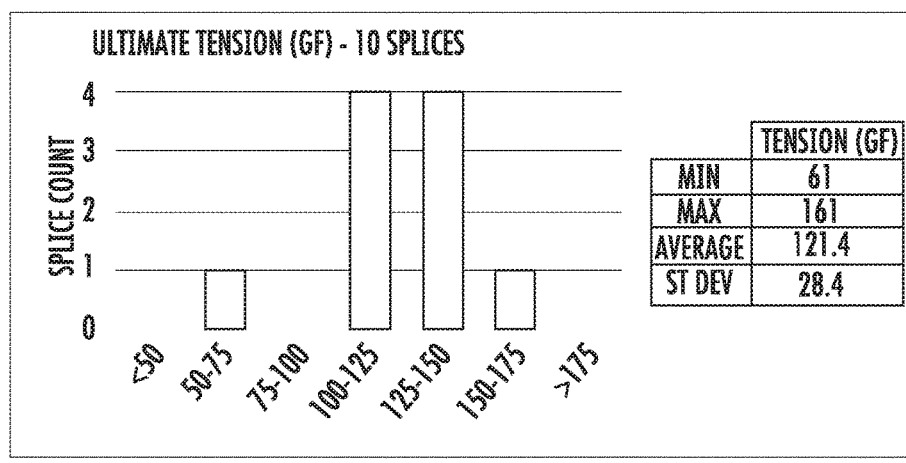
FIG. 9 is a table illustrating splice strength test results in accordance with embodiments of the present disclosure.

FIG. 8 illustrates a strength test setup utilized to measure the ultimate tension of a spliced together first and second optical fiber 10, 20 in accordance with embodiments of the present disclosure. FIG. 9 is a table illustrating splice strength test results from such testing.

To utilize such strength test setup, after a splice was completed, it was transferred to the tensioning mechanism 100 illustrated in FIG. 8. This mechanism includes two holding blocks 102, 104 that clamp securely on the coating of each fiber 10, 20, respectively such that the bare cladding of each fiber and the splice are situated between the two blocks.

When the tensioning process was initiated, the first block 102 was moved outward along a longitudinal direction, gradually increasing the linear tension applied to the splice. A calibrated load cell 104 attached to the second block displayed the applied tension in gram force (gf). The tension on the splice joint was increased until the splice broke, and the ultimate tension was recorded.

To determine process strength repeatability, a set of ten (10) consecutive splices between FiberLabs ZSF-9/125-N-0.26 ZBLAN and Fujikura RCSM-PS-U17C fibers were performed using the above described optimized and automated splice process. Strength was measured using the above setup and the results are displayed in FIG. 9. The average ultimate tension measured was 121.4 gf, with 90% of the samples with ultimate tension above 100 gf.

It is worth noting that the ultimate tension was recorded in gf, as it can be difficult to define an area of application for a splice between a 125 μm and 80 μm fiber in order to convert it into tensile strength units. For comparison an ultimate tension of 100 gf corresponds to ultimate tensile strengths of 11.6 kpsi (79.9 MPa) and 28.3 kpsi (195.1 MPa) for 125 μm and 80 μm fiber diameters respectively.

For comparison, the test was first performed on a straight piece of non-stripped ZBLAN fiber and an ultimate tension of 837 gf was recorded, which corresponds to an ultimate tensile strength of 97 kpsi.

Additionally, inspection of the ZBLAN fiber after the splice break confirmed that the silica fiber left a clear imprint on the ZBLAN fiber end face, and that the ZBLAN fiber contraction post-heating applied radial forces to the silica fiber. Additionally, the silica fiber broke before separating from the ZBLAN fiber.

EXAMPLE 2

Figure 10:
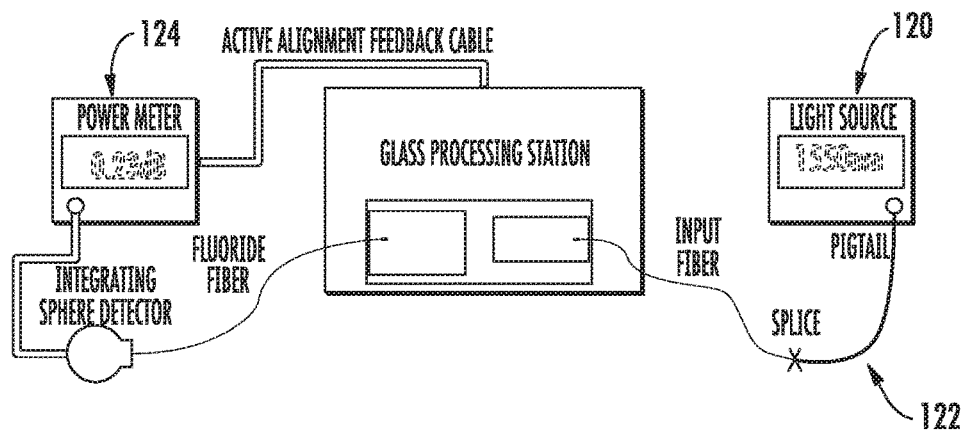
FIG. 10 illustrates in insertion loss test setup in accordance with embodiments of the present disclosure.
Figure 11:
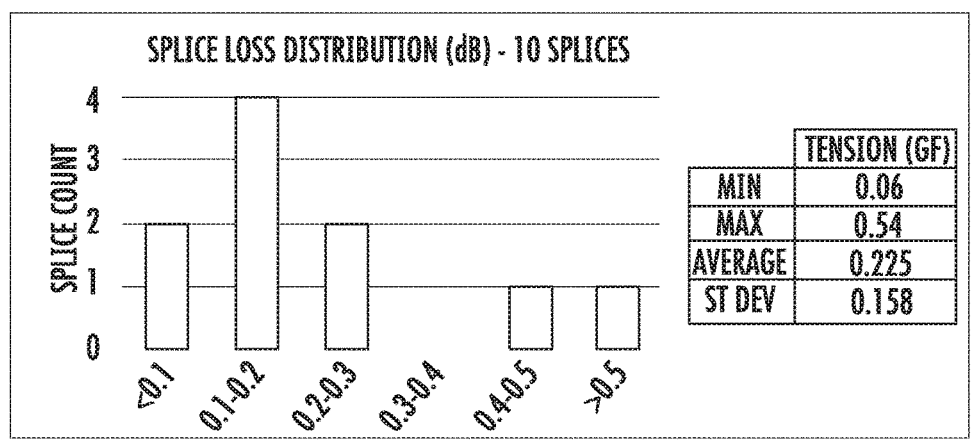
FIG. 11 is a table illustrating splice loss test results in accordance with embodiments of the present disclosure.

FIG. 10 illustrates an insertion loss test setup utilized to measure splice loss in accordance with embodiments of the present disclosure. FIG. 11 is a table illustrating splice loss test results from such testing.

To utilize such insertion loss test setup, 1550 nm light was generated from a light source 120, in this case an Agilent HP-81554SM module in an Agilent 8163A optical chassis, and coupled into a pigtail 122, in this case a SMF-28e+ pigtail. Prior to starting the experiment, the beam quality of the source was checked using a DataRay Beam'R2 slit scan beam profiler as well as a LD8900 far field scanner from Photon-Inc. to ensure operation in the single-mode regime.

Loss measurements were performed using a power meter 124, in this case an Agilent 8163A optical chassis fitted with an Agilent HP-81533B module and connected to an Agilent HP 81521B Power Detector Head fitted with an Agilent HP-81002FF integrating sphere. The total drift of the source over the test period was established to be <0.02 dB.

After referencing the detector, a piece of a selected silica fiber was spliced to the SMF-28e+ pigtail. The beam quality was checked again and a new reference was made on the detector.

To measure the splice loss, one end of the ZBLAN fiber was stripped and cleaved using a Fujikura CT-101 tension-scribe cleaver set to 125 g tension, and subsequently inserted in the integrating sphere detector. The automatized splice process used an active power meter feedback loop to optimize insertion loss prior to splicing. This was necessary due to the very high eccentricity of the ZBLAN fiber (>5 μm). The final loss was measured, and the splice loss $L_{splice}$ was calculated using the following equation:

$$L_{splice} = L_{measured} - l \times \alpha_{ZBLAN}$$

$L_{measured}$ refers to the loss measured by the detector in dB, l is the length of ZBLAN fiber after the splice in meters, and $\alpha_{ZBLAN}$ is the attenuation of the ZBLAN fiber in dB/m. The value of $\alpha_{ZBLAN}$ was provided by the manufacturer as being 0.083 dB/m at 1550 nm.

Process loss repeatability was determined from another set of ten (10) consecutive splices between FiberLabs ZSF-9/125-N-0.26 ZBLAN and Fujikura RCSM-PS-U17C. The transmission loss at 1550 nm was measured using the above setup and the results are shown in FIG. 11.

With an average loss of 0.225 dB, a minimum of 0.06 dB and a maximum loss of 0.54 dB, this data demonstrates the described method achieved consistent, low loss splice joints between ZBLAN and SiO2 fibers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for splicing optical fibers, the method comprising:
    aligning the cores of a first optical fiber and second optical fiber to be spliced together such that the cores are both generally concentric along a longitudinal axis, wherein a maximum outer diameter of an end portion of the second optical fiber is less than a maximum outer diameter of an end portion of the first optical fiber, and wherein the first optical fiber is a fluoride optical fiber and the second optical fiber is a silica optical fiber;
    heating the end portions of the first and second optical fibers;
    moving, during the heating step, at least one of the first or second optical fiber towards the other of the first or second optical fiber along the longitudinal axis such that the end portion of the second optical fiber protrudes into the end portion of the first optical fiber;
    discontinuing heating of the end portions of the first and second optical fibers; and
    continuing moving the at least one of the first or second optical fiber towards the other of the first or second optical fiber after discontinuing heating.

2. The method of claim 1, wherein the fluoride optical fiber is a Zblan optical fiber.

3. The method of claim 1, wherein an outer diameter of the entire second optical fiber is less than an outer diameter of the entire first optical fiber.

4. The method of claim 1, further comprising tapering the second optical fiber to have the end portion with a maximum outer diameter that is less than the maximum outer diameter of the end portion of the first optical fiber.

5. The method of claim 4, further comprising cleaving the end portion of the second optical fiber after tapering the second optical fiber.

6. The method of claim 1, wherein, after the aligning step and before the moving step, a gap is defined along the longitudinal axis between the end portions of the first end second optical fibers.

7. The method of claim 6, wherein the gap is between 5 microns and 30 microns.

8. The method of claim 1, wherein the heating step begins between 50 and 200 milliseconds prior to the moving step.

9. The method of claim 1, wherein the end portions of the first and second optical fibers are heated to the melting point of the first optical fiber.

10. The method of claim 1, wherein the end portions of the first and second optical fibers are heated to between 175 and 325 degrees Celsius.

11. The method of claim 1, wherein the at least one of the first or second optical fiber is moved at between 0.05 and 0.25 millimeters per second.

12. The method of claim 1, wherein, during the moving step, a maximum length of between 5 and 30 microns of the end portion of the second optical fiber is protruded into the end portion of the first optical fiber.

13. The method of claim 1, during the continuing moving step, a maximum additional length of between 2 and 10 microns of the end portion of the second optical fiber is protruded into the end portion of the first optical fiber.

14. A method for splicing optical fibers, the method comprising:
    aligning the cores of a first optical fiber and second optical fiber to be spliced together such that the cores are both generally concentric along a longitudinal axis, wherein a maximum outer diameter of an end portion of the second optical fiber is less than a maximum outer diameter of an end portion of the first optical fiber, and wherein the first optical fiber is a fluoride optical fiber and the second optical fiber is a silica optical fiber, and wherein after aligning the cores a gap is defined along the longitudinal axis between the end portions of the first end second optical fibers;
    heating the end portions of the first and second optical fibers to between 175 and 325 degrees Celsius;
    moving, during the heating step, at least one of the first or second optical fiber towards the other of the first or second optical fiber along the longitudinal axis such that the end portion of the second optical fiber protrudes into the end portion of the first optical fiber;
    discontinuing heating of the end portions of the first and second optical fibers; and
    continuing moving the at least one of the first or second optical fiber towards the other of the first or second optical fiber after discontinuing heating.

15. The method of claim 1, wherein an outer diameter of the entire second optical fiber is less than an outer diameter of the entire first optical fiber.

16. The method of claim 1, further comprising tapering the second optical fiber to have the end portion with a maximum outer diameter that is less than the maximum outer diameter of the end portion of the first optical fiber.

17. The method of claim 1, wherein the heating step begins between 50 and 200 milliseconds prior to the moving step.

18. The method of claim 1, wherein the at least one of the first or second optical fiber is moved at between 0.05 and 0.25 millimeters per second.

19. The method of claim 1, wherein, during the moving step, a maximum length of between 5 and 30 microns of the end portion of the second optical fiber is protruded into the end portion of the first optical fiber.

20. The method of claim 1, during the continuing moving step, a maximum additional length of between 2 and 10 microns of the end portion of the second optical fiber is protruded into the end portion of the first optical fiber.

* * * * *